US012444272B2

(12) United States Patent
deWaal

(10) Patent No.: US 12,444,272 B2
(45) Date of Patent: Oct. 14, 2025

(54) SYSTEM, METHOD, AND GAMING MACHINE FOR PLAYING ELECTRONIC CARD GAMES

(71) Applicant: Double D Holdco, LLC, Reno, NV (US)

(72) Inventor: Daniel Jacobus deWaal, Reno, NV (US)

(73) Assignee: Double D Holdco, LLC, Reno, NV (US)

( * ) Notice: Subject to any disclaimer, the term of this patent is extended or adjusted under 35 U.S.C. 154(b) by 259 days.

(21) Appl. No.: 18/231,140

(22) Filed: Aug. 7, 2023

(65) Prior Publication Data

US 2024/0087422 A1 Mar. 14, 2024

Related U.S. Application Data

(60) Provisional application No. 63/373,730, filed on Aug. 28, 2022, provisional application No. 63/370,670, filed on Aug. 7, 2022.

(51) Int. Cl.
*G07F 17/32* (2006.01)

(52) U.S. Cl.
CPC ...... *G07F 17/3267* (2013.01); *G07F 17/3262* (2013.01); *G07F 17/3293* (2013.01)

(58) Field of Classification Search
CPC ............. G07F 17/3267; G07F 17/3262; G07F 17/3293
USPC ................................................ 463/11, 12, 13
See application file for complete search history.

(56) References Cited

U.S. PATENT DOCUMENTS

| | | | | |
|---|---|---|---|---|
| 8,758,109 B2 * | 6/2014 | Lutnick | G07F 17/3293 463/16 |
| 8,759,111 B2 * | 6/2014 | Crunaire | B01J 20/28047 436/127 |
| 10,275,991 B2 | 4/2019 | Craig | |
| 10,607,435 B2 * | 3/2020 | Lutnick | G07F 17/3262 |
| 10,964,156 B2 | 3/2021 | Strand | |
| 11,132,870 B2 * | 9/2021 | Lutnick | G07F 17/3293 |
| 11,361,610 B2 * | 6/2022 | Lutnick | G07F 17/3258 |
| 12,198,504 B2 * | 1/2025 | Lutnick | G07F 17/3239 |
| 2012/0052939 A1 * | 3/2012 | Lutnick | G07F 17/3262 463/25 |
| 2020/0302744 A1 * | 9/2020 | Lutnick | G07F 17/32 |
| 2021/0241570 A1 | 8/2021 | Robinson | |
| 2022/0092939 A1 * | 3/2022 | Lutnick | G07F 17/3223 |

* cited by examiner

*Primary Examiner* — Pierre E Elisca
(74) *Attorney, Agent, or Firm* — Howard & Howard Attorneys PLLC

(57) ABSTRACT

A system, method, and gaming machine includes a plurality of electronic cards and having a Random Number Generator (RNG), wherein a controller includes a processor to execute an algorithm of instructions to receive the input from at least one input device, presenting a predetermined number of the electronic cards for a Base Game, receive an input from the at least one input device for an amount of credits and decreasing the amount of credits from a credit meter, receive a selection of one of the predetermined number of the electronic cards from the at least one input device, reveal all of the predetermined number of the electronic cards, and if a special electronic card or other winning outcome was selected, display by the win meter an award amount and crediting the credit meter with the award amount.

25 Claims, 15 Drawing Sheets

BONUS LEVEL 2 TO BONUS LEVEL 3

SYSTEM, METHOD, AND GAMING MACHINE FOR PLAYING ELECTRONIC CARD GAMES

CROSS-REFERENCE TO RELATED APPLICATION(S)

This application claims priority to and the benefit of U.S. Provisional Patent Application Ser. No. 63/370,670, filed Aug. 7, 2022, and U.S. Provisional Patent Application Ser. No. 63/373,730, filed Aug. 28, 2022 both disclosures of which are hereby incorporated by reference in their entirety for all purposes.

COPYRIGHT NOTICE

The figures included herein contain material that is subject to copyright protection. The copyright owner has no objection to the facsimile reproduction by anyone of this patent document as it appears in the U.S. Patent and Trademark Office, patent file or records, but reserves all copyrights whatsoever in the subject matter presented herein.

BACKGROUND OF THE INVENTION

It is known to provide electronic card games such as video card games for playing games such as poker. In a typical video electronic card game, there are multiple cards dealt to allow a player to have a hand for the poker game. The player may choose to discard one or more cards and have dealt new cards to reveal a wining hand.

Video card games are popular forms of entertainment that allow players to place bets on the outcome of card selections from a deck of cards. Some examples of video card games are video poker, video blackjack, and video baccarat. However, existing video card games have rules or odds that limit support scalable large awards. For instance, video poker games typically use a standard 52-card deck and have fixed pay tables for different poker hands with the maximum award being driven by the hit frequency of a Royal Flush. Video blackjack and video baccarat games are based on the rules of traditional table games and similarly have limited options for large Jackpots having to rely instead on side bets to drive larger jackpots.

SUMMARY OF THE INVENTION

The present invention provides a system, method, and gaming machine to play new skill-based family of electronic card games that use a fair deck of 52 traditional cards and some additional proprietary cards to provide players with prizes, multipliers, free picks, bonus games and jackpots and feature elements that persist from game to game, multiple bonus games or levels of bonus game, and an assortment of jackpots, awards, and prizes.

The present invention also provides a system, method, and gaming machine having a game display configured to display a plurality of electronic cards of the electronic card game, at least one input device to provide an input, a credit meter, and a win meter, a controller programed to display, on the game display, the electronic cards, and having a Random Number Generator (RNG), wherein the RNG calls are limited to a predetermined number of the electronic cards in each card deck, and wherein the controller includes a processor to execute an algorithm of instructions to receive the input from the at least one input device, present a predetermined number of the electronic cards on the game display for a Base Game, the predetermined number of electronic cards being determined by the RNG, receive an input from the at least one input device for an amount of credits and decrease the amount of credits from a credit meter, receive a selection of one of the predetermined number of the electronic cards from the at least one input device, reveal all of the predetermined number of the electronic cards on the game display, and if a special electronic card or other winning outcome was selected, display by the win meter an award amount and crediting the credit meter with the award amount.

One advantage of the present invention is that the system, method, and gaming machine may be applied to electronic card games to allow the player to pick a card and press reveal to play to win a hand. Another advantage of the present invention is that the system, method, and gaming machine allows for a card picking game with multipliers and free picks that persist from game to game. Yet another advantage of the present invention is that the system, method, and gaming machine allow the card picking game to have a spoiler "What you could have won" reveal after each hand. Still another advantage of the present invention is that the system, method, and gaming machine allow the card picking game to have nested bonus levels with multiple card bonus decks. A further advantage of the present invention is that the system, method, and gaming machine allow the card picking game to increase the overall game experience with endless game variations possible.

Other features and advantages of the invention will be readily appreciated as the same becomes better understood by reference to the following detailed description when considered in connection with the accompanying drawings.

DETAILED DESCRIPTION OF THE PREFERRED EMBODIMENT(S)

The exemplary embodiments herein relate to various systems and methods used in gaming applications. It should be understood that each of the methods and individual steps recited herein may be partially or wholly carried out in a variety of ways and/or systems, which may include, but are not limited to, an electronic gaming machine ("EGM") or electronic game machine such as video game for use by one or more players, a multiplayer platform which may include a player interface such as a touchscreen display and involve physical or virtual game symbols, a home computer and/or portable computing device, such as a tablet computer or mobile phone capable of communicating with a network or over the Internet, global telecommunication network or world wide web.

It should further be understood that the present invention is directed to, among other things, methods of providing, conducting and resolving skill-based games that include a sequence of controlled and concrete events. Some of these events may involve communications between computing components, establishing the eligibility of such computing components based on location and game specific rules, indication preferences, placing credits, debiting and awarding credits stored in an account, the generation or interpretation of random data and results for one or more players, the application of randomly-generated data to predefined rules, the determination of credit outcomes in accordance with preset outcome determining criteria, and the notification of such outcomes. The generation of random data may be facilitated by computerized and/or physical implements, such as a random number generator ("RNG") or credits/chips awarded. It should be appreciated that the present invention increases the efficiency of the processing for a processor in the system.

A selected embodiment of the present invention will now be explained with reference to the drawings. It will be apparent to those skilled in the art from this disclosure that the following description of the embodiment of the present invention is provided for illustration only and not for the purpose of limiting the present invention as defined by the appended claims and their equivalents.

Figure 1:
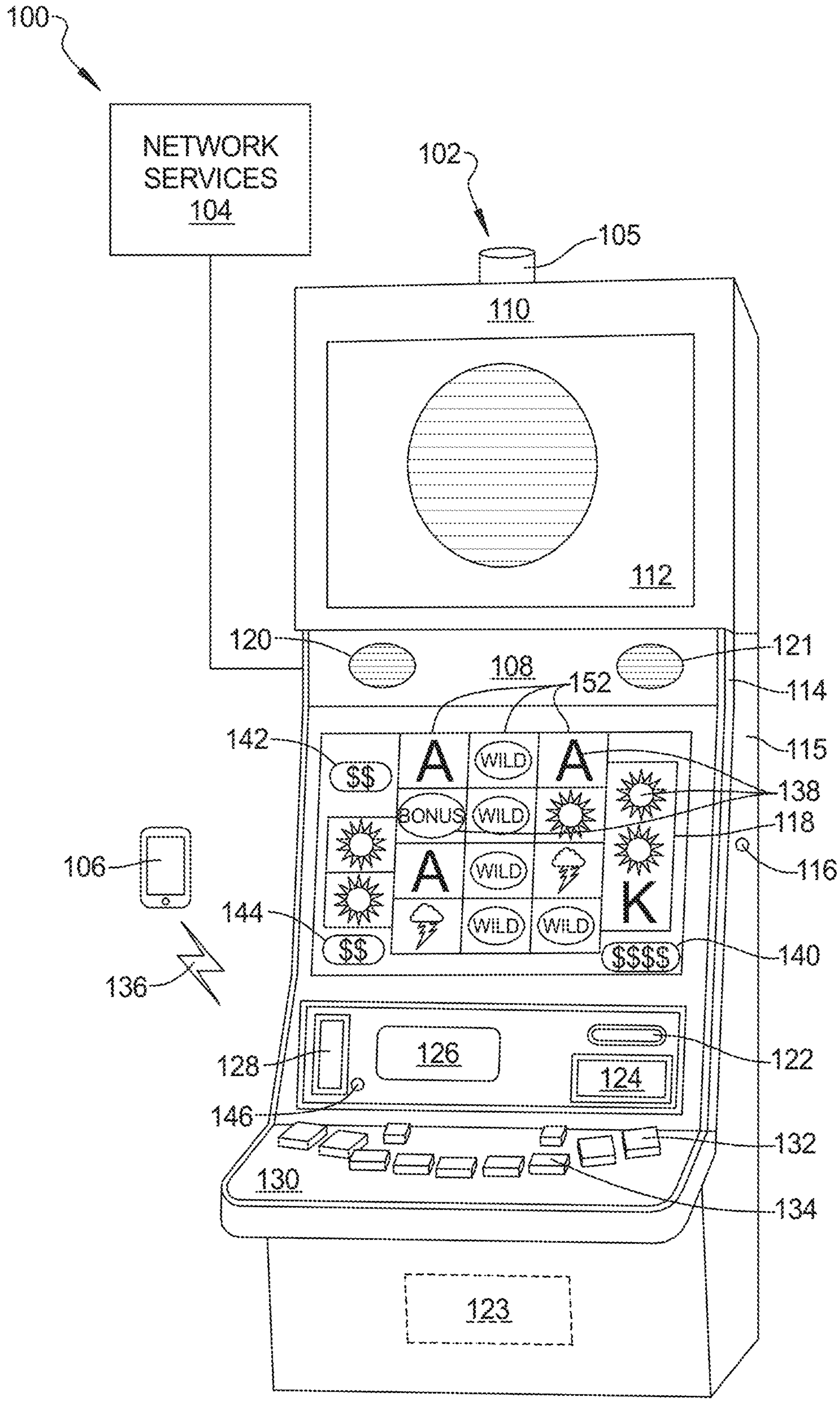
FIG. 1 is a schematic representation of a system for an electronic card game illustrated on a gaming machine, according to an embodiment of the present invention.

In general, gaming systems which provide electronic card-based games are described. In particular, with respect to FIG. 1, a gaming system 100 includes an electronic card-based gaming machine 102 such as an electronic card game video machine. The electronic card-based gaming machine 102 may include wireless or wired communication interfaces which allow communications with remote devices providing network services 104, such as, but not limited to, a player tracking system or a progressive gaming system. The player tracking system can be part of a game accounting system. In addition, the gaming machine 102 may include wireless communication interfaces, such as wireless interface 146, which allow communications with a nearby mobile device, such as a mobile phone 106 or tablet computer, via a wireless connection 136. It should be appreciated that the wireless interface 146 may employ wireless communication protocols, such as Bluetooth™ or Wi-Fi.

The mobile phone 106 or tablet computer can be utilized by a player or casino operator. A device carried by a player can be configured to perform gaming related functions, such as functions associated with transferring funds to or from the gaming machine 102 or functions related to player tracking. A device carried by a casino operator can be configured to perform operator related functions, such as performing hand pays, responding to tilt conditions or collecting metering related information.

The gaming machine 102 may include a cabinet 108 and a top box 110. The top box 110 is mounted above the cabinet 108. The top box 110 includes a display 112. The display 112 may be used to display video content, such as game art associated with the game played on the gaming machine 102. For example, the game art can include an electronic card deck or animated wheel. It should be appreciated that the animated wheel can be configured to spin and to stop to reveal electronic cards for a bonus award. In other examples, the video content can include advertising and promotions.

In other embodiments, the top box 110 may include one or more mechanical devices in addition to the display or in lieu of the display. In yet other embodiments, the top box 110 may include a plurality of displays.

The cabinet 108 may include an entry door 114. In one embodiment, the door 114 swings outward and is coupled to a back portion 115. The door 114 includes a locking mechanism 116. During operation, the door 114 is locked. Typically, unlocking the door 116 causes the gaming machine 108 to enter a tilt mode where gaming functions, such as the play of a skill-based game, are not available. It should be appreciated that this tilt mode can be referred to as a hard tilt.

The cabinet 108 may include a number of apertures that allow access to a portion of a number of devices which are mounted to the cabinet 108. These gaming devices can include, but are not limited to a display 118, speaker 120, speaker 121, a printer 122, a bill acceptor 124, a secondary display 126, a card reader 128 and a button panel 130 including buttons 132 and 134. It should be appreciated that these gaming devices can be used to generate skill-based game play on the gaming machine 102.

In particular embodiments, the bill acceptor 124 may be used to accept currency or a printed ticket which can be used to deposit credits on the gaming machine 102. The credits may be used for playing the game and are stored in a credit meter. The printer 122 can be used to print tickets to transfer credits from the gaming machine 102. Typically, the tickets may be redeemed for cash or additional game play, such as game play on another gaming machine.

The bill acceptor 124 and printer 122 printer may be part of ticket-in/ticket-out (TITO) system (not shown) The TITO system may be included in the network services. The TITO system allows a ticket printed at a first gaming machine with a credit amount to be inserted into a bill acceptor at a second gaming machine and validated for game play. After validation, the credit amount associated with the ticket can be made available for game play on the second gaming machine.

The bill acceptor 124 may include a slot surround by a bezel which allows banknotes of various denominations or printed tickets to be inserted into the bill acceptor. The bill acceptor 124 may include sensors for reading information from the banknotes and determining whether the banknotes inserted through the slot are valid. Banknotes determined to be invalid, such as damaged or counterfeit notes, can be ejected from the bill acceptor 124. In some instances, the bill acceptor 124 may include upgradeable firmware and a network connection. It should be appreciated that via the network connection, new firmware, such as new counterfeit detection algorithms can be downloaded to the bill acceptor 124.

The bill acceptor 124 includes mechanisms for guiding the banknotes or printed tickets past the internal sensors. Banknotes or printed tickets which are accepted can be guided to a bill stacker (not shown) located within the cabinet 108 of the gaming machine 102. It should be appreciated that the bill stacker can hold a maximum number of bank notes or printed tickets, such as up to two thousand.

The gaming machine 102 may include a sensor for detecting a fill level of the bill stacker. When the bill stacker is full or close to being full, the gaming machine 102 can be placed in a tilt mode. Next, the cabinet door 114 can be opened and the full bill stacker can be replaced with an empty one. Then, the door 114 can be closed and the gaming machine 102 can be restored to an operational mode in which it is available for game play.

One function of the printer 122 is to print “cash out” tickets. In a “cash out,” credits available on the gaming machine 102 may be transferred to an instrument, such as a printed ticket, or electronically transferred to an account for later access. Typically, a “cash out” can be initiated in response to pressing one of the physical buttons, such as 132 or 134, or touch screen button output on a display, such as display 118.

In one embodiment, the printer 122 may be a thermal printer. The printer can be loaded with a stack of tickets, such as a stack with two hundred, three hundred or four hundred tickets. Mechanisms in the printer 122 can grab tickets from the ticket stack and transport the tickets past the print heads for printing. It should be appreciated that the ticket stack may be located in an interior of the cabinet 108.

The printer 122 can include sensors for detecting paper jams and a status of the ticket stack. When a paper jam or low ticket stack is detected, the gaming machine 102 can enter a tilt mode where game play is suspended. In one embodiment, a tower light 105 can light to indicate the tilt status of the gaming machine 102. After the tilt condition is cleared, such as by clearing the paper jam or replenishing the ticket stack, the gaming machine 102 can enter an operational mode where game play is again available.

In particular embodiments, the printer 122 can be coupled to a gaming machine controller 123. The gaming machine controller 123 can be configured to send commands to the printer which cause a “cash out,” ticket to be generated. In addition, the printer 122 can be coupled to other systems, such as a player tracking system (not shown). When coupled to the player tracking system, commands may be sent to the printer 122 to output printed tickets redeemable for comps (comps refer to complimentary awards, such as but not limited to free credits, a free drink, a free meal or a free room) or printed coupons redeemable for discounts on goods and services.

In additional embodiments, a wireless interface 146 can be provided to generate the wireless connection 136. The wireless connection 136 may be established between the gaming machine 102 and the mobile device 106. The wireless connection 136 can be used to provide functions, such as, but not limited to, player tracking services, casino services (e.g., ordering drinks) and enhanced gaming features (e.g., displaying game play information on the mobile device). The wireless interface can be provided as a stand-alone unit or can be integrated into one of the devices, such as the bill/ticket acceptor 122 and the card reader 128. In addition, the bill/ticket acceptor 122 and the card reader 128 can each have separate wireless interfaces for interacting with the mobile device. In one embodiment, these wireless interfaces can be used with a wireless payment system, such as Apple Pay™ or Google Pay™. It should be appreciated that the wireless payment system can be used to transfer funds to the gaming machine that can be used for skill-based game play.

The door 114 can allow access an interior of the cabinet 108. Via this access, devices mounted to the cabinet, such as display 118, speaker 120, bill/ticket acceptor 122 or printer 124 can be serviced and maintained. For example, a receptor configured to receive currency and tickets, coupled to the bill acceptor, can be emptied. The receptor is often referred to as a bill stacker. In another example, blank tickets can be added to the printer 122 or paper jams can be cleared from the printer. When door 114 is opened, the gaming machine 102 can enter a hard tilt state where game play is disabled.

In addition, a number of devices (not shown) can be provided within the interior of the cabinet 108. A portion of these devices is not visible through an aperture in the cabinet 108. For example, a gaming machine controller (GMC) 123 which controls play of an electronic card-based game on the gaming machine may be found within the cabinet 108. It should be appreciated that the gaming machine controller 123 is typically secured within a separate lockable enclosure (not shown).

As another example, a number of security sensors can be placed within the interior of the cabinet 108. The security sensors (not shown) can be configured to detect access to the interior of the gaming machine 102 For example, the sensors can be configured to detect when the locking mechanism 106 is actuated, the door 116 is opened or a locking mechanism associated with the enclosure for the gaming machine controller 123 is actuated. It should be appreciated that a power source, separate from an external power supply, such as a battery can be provided which allows the security sensors to operate and be monitored when the external power supply is not connected.

In particular embodiments, the cabinet 108 can have a sheet metal exterior designed to provide the rigidity needed to support top boxes and light kits as well as to provide a serious deterrent to forced entry. For example, the sheet metal can be sixteen gauge steel sheet. Additionally, the door, such as 114, can be backed with sheet steel in the areas around the displays. It should be appreciated that other materials, such as wood, wood composites, can be incorporated into the cabinet 108 and the example of sheet metal is provided for the purposes of illustration only.

A speaker, such as 120 or 121, can be protected by a metal screen. In one embodiment, the speaker 120 or 121 can be a subwoofer speaker. In general, a sound system associated with the gaming machine 102 can include an audio amplifier and one or more speakers of various types, such as subwoofers, midrange speakers and tweeters.

The displays 118, 112, and 126, the speakers 120 and 121, the printer 122, the bill acceptor 124, the card reader 128 and the button panel 130 can be used to generate a play of a skill-based game on the gaming machine 102. Further, the display 118 can include a touchscreen. The touchscreen can be used to provide inputs used to play the skill-based game and include a win meter. The skill-based games that can be played include, but are not limited to, electronic card games. The electronic card-based games are typically games of chance and utilize a random number generator (RNG) to determine an outcome to the game.

In general, the electronic card-based games can be classified as Class III games. Class III games can include, but are not limited to blackjack, poker, etc.

As described above, the electronic card-based game may be an electronic card game. In general, the electronic card game of the present invention has been named "Piqum™" and includes various Piqum™ game variants in which players have simple choices or selections to make in each game, and there is a skill component associated with each selection. In each Piqum™ game round, players must select one (1) of five (5) electronic cards and, in most sets of electronic card selections, there are winners, losers, or next step outcomes. Next Step outcomes are outcomes that lead to the possibility of future wins like electronic cards that unlock bonus games or award multipliers. At the conclusion of each selection, players are shown all five (5) cards so that they can see what was not selected.

In the present invention, there are custom electronic card decks for each game variant and there are usually multiple decks per game. The electronic card decks are based on a full or subset of a traditional fifty-two (52) card deck to which at times, game specific or special electronic cards are added. In most of the game variants, electronic cards such as "Jokers" are added to game decks to manage volatility and game hold percentages. It should be appreciated that the special electronic cards may be, for example, Royal cards.

In the Piqum™ games, players have control over volatility as they can pick game variants to which more Jokers have been added allowing for greater awards to be associated with winning outcomes. For example, in Piqum™ Classic, there might be a single Bonus game triggering card in the game deck and thirty-five (35) Joker cards. In Bonus Piqum™ there might be two Bonus game triggering cards in the game deck and fifty (50) Joker cards. It should be appreciated that the increased frequency of Bonus events associated with access to large jackpot awards is facilitated by offsetting the increased pays by adding more Jokers to the base game deck so that that the odds of selecting a Bonus triggering card are smaller. It should also be appreciated that players can also choose to play more than one game concurrently making picks from multiple rows of five (5) cards before initiating a reveal.

In most Piqum™ games, a Random Number Generator (RNG) processor calls and determines which cards are dealt and are confined to calls within defined virtual card decks. For example, a game with seventy (70) unique cards in the base game deck, or five (5) cards in a specific Bonus Game deck, the RNG calls would be limited to calls for results from either the seventy (70) available results in the base game or five (5) cards in a specific bonus game, resulting in all cards in the deck having an equal chance of being dealt also known as a "Fair Deck" game. It should be appreciated that, in some instances, traditional processor driven RNG calls could be replaced by inputs from outside systems such as Bingo Ball Draw mechanisms to derive dealt card selection.

In general, the play of the electronic card game can involve receiving a credit amount and initiating a start of the skill-based game. A selection of a wager amount and a start of the skill-based game can be performed using buttons, such as 132 and 134, on the button panel 130. In addition, the button panel can be used to perform gaming functions, such as selecting the amount to wager in credits, initiating a cash-out, and calling an attendant. It should be appreciated that these functions will vary for different types of games.

The play of skill-based game, such as the electronic card game, can involve making a wager and then generating and outputting a game presentation. The bet amount can be indicated in 142. The game presentation can include a number of game features that vary from game to game. The game features provide variety in how the outcome to the skill-based game is presented. For example, an award to the outcome of the game can be presented in a series of steps that vary from game to game. In some instances, a portion of the total award for a game can be awarded in each step. The steps and their graphical presentation can be referred to as game features. In various embodiments, information associated with one or more of the steps can be stored to a power hit tolerant memory.

As an example, a portion of the electronic card game outcome presentation is shown on the display 118. The electronic card game outcome presentation can include displaying a plurality of electronic cards 152 having indicia 138 such as numbers, caricatures, hearts, etc. During the game outcome presentation, the electronic cards 152 can appear on the display 118. The gaming machine controller 123 includes a Random Number Generator (RNG) to generate the electronic cards 152. It should be appreciated that the electronic cards 152 move off the display 118 and new electronic cards 152 can appear on the display 118. It should be appreciated that persistent multipliers and the process of progressing from one bonus level to the next, but in Piqum™ each level is a new amount of credits to be played. It should also be appreciated that the seventy (70) card deck is shuffled after each game so that no more than five (5) cards are ever drawn before the card is shuffled again. It should further be appreciated that the five (5) cards presented for player selection are the result of sequential RNG calls by the processor to the seventy (70) card virtual base game deck.

Different combinations of electronic cards 152 can appear on the display 118 for some period of time, which varies for each instance of the skill-based game that is played. At the end of the presentation, the electronic cards 152 are revealed and an award associated with the game outcome is presented on the display 118. The total award for the game can be indicated in 144 and the total credits available on the gaming machine 102 after the award can be indicated in 140.

Figure 2A:
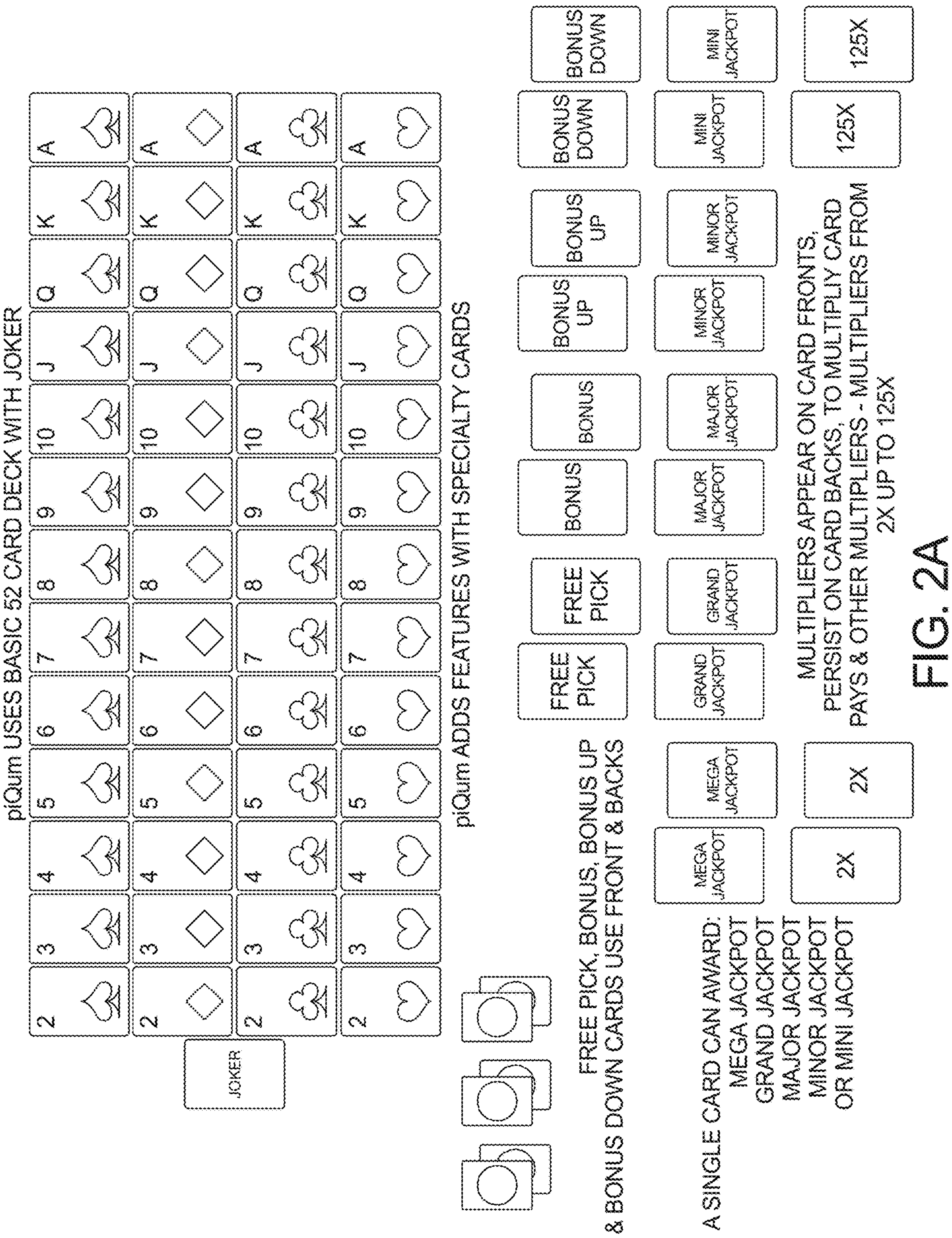
FIGS. 2A and 2B are exemplary views of electronic card game having multiple electronic cards for bonus games that may be used with the system shown in FIG. 1.
Figure 2B:
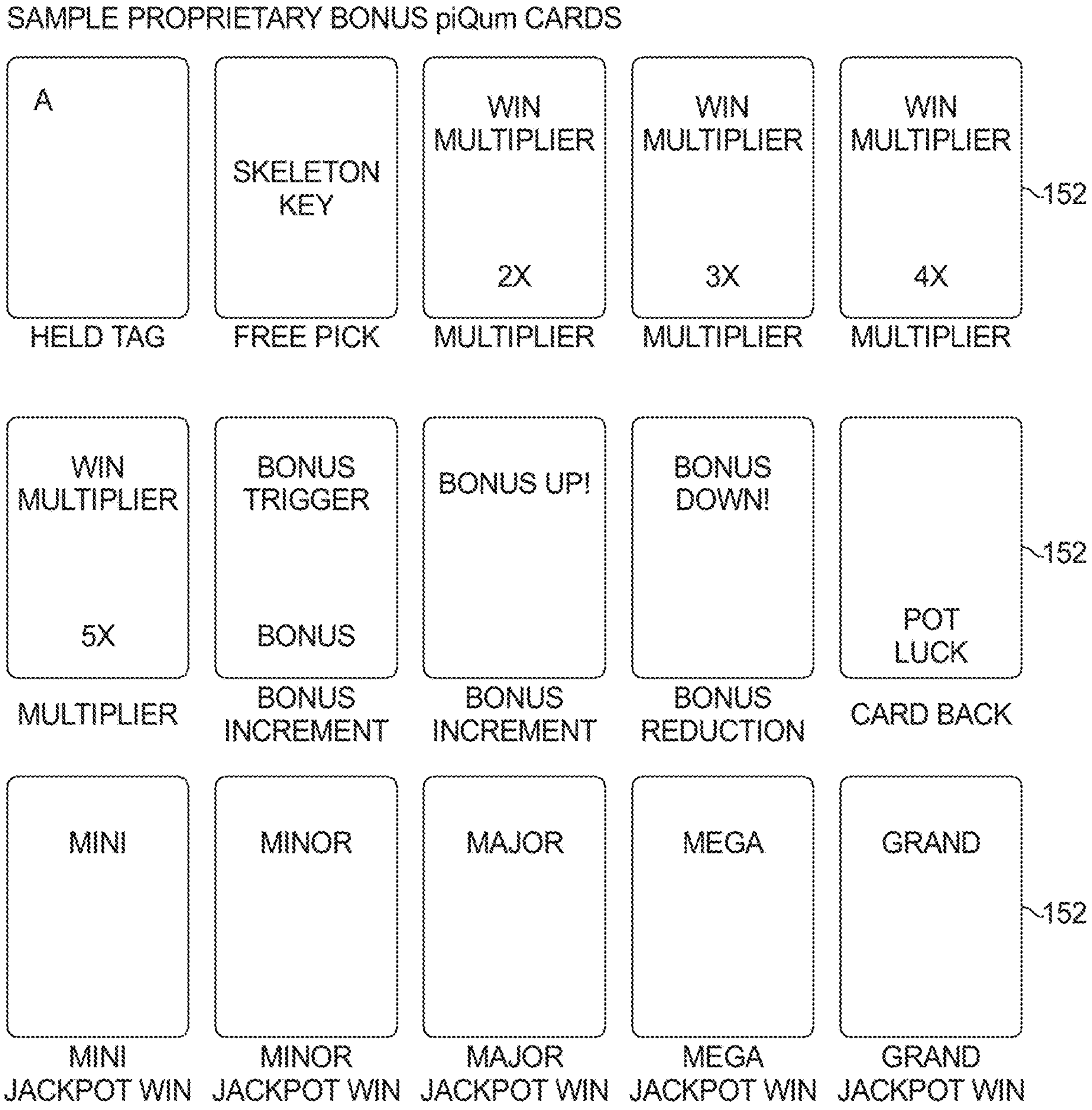

The gaming system 100 may include electronic card wagering games 150 including the electronic cards 152 and corresponding game methods. An example of the electronic cards 152 are illustrated in FIGS. 2A and 2B. The example electronic card wagering games 150 are illustrated in FIGS. 3-11. The present invention of electronic card wagering games 150 consist of skill-based electronic card games in which players have to select a card in each game round. In the present invention, the games feature elements persist from game to game, multiple bonus games or levels of bonus game, and an assortment of jackpots, awards, and prizes.

The Piqum™ card games may be deployed in other electronic forms, in some instances as real money or social iGames that are either served as online games by remote game servers or alternatively can be downloaded as mobile or desktop device applications where the game logic executes locally. It should be appreciated that the present invention can be used in the extremely popular i-Gaming and land-based applications as well.

The Piqum™ games may also be deployed on video gaming terminals, either as slot machine or video lottery terminal games. When deployed in electronic forms, the Piqum™ electronic card game decks are configured as data arrays and random number generators are used to deal virtual cards from these virtual game deck arrays to possible selection locations on game displays. It should be appreciated that, in some instances, such as in lottery environments, weighted tables could be used to control what virtual cards are available and displayed and, in the case of Class II tribal games, random number generators could be replaced by bingo ball draw engines.

The core electronic card game of Piqum™ includes a Base Game with a traditional fifty-two (52) card deck to which several Jokers, Free Pick, Multiplier, and Bonus Game electronic cards have been added as well as several Bonus Games each with its own, dedicated Bonus Game deck of electronic cards 152 as illustrated in FIG. 2B. In the event that a player selects a specific Bonus Game electronic card during the Base Game, for example Bonus Game A, the game switches to an electronic deck of cards that is unique to the selected Bonus Game, in this case Bonus Game A card deck. Bonus Games are at times nested, and some Bonus Games, specifically games with greater awards can only be accessed from other Bonus Games. For example, the Bonus Game A electronic card deck might consist of five (5) cards, three (3) $5 award cards, a $10 award card, and a Bonus Game B card. If the player picks the Bonus Game B card, then the next game will switch to the Bonus Game B electronic deck of cards. In the Piqum™ electronic card game, once a player has entered a Bonus game, they will always either win an award or progress from one Bonus Game to another until they do win an award. Once a player wins an award, they exit the Bonus Game and return to the Base Game.

Bonus Piqum™ is an electronic card game with persistence, multiple bonus levels and five (5) progressive Jackpot awards, Mini, Minor, Major, Mega and Grand electronic cards 152 as illustrated in FIG. 2B that become available as players progress to through various bonus levels. It should be appreciated that Bonus Piqum™ is a variant of the Piqum™ family of electronic card games.

Base Game: The base game of Piqum™ uses a fair deck of 95 cards, including 52 traditional cards, 37 joker cards, one free pick card, one 2× card, one 3× card, one 4× card, one 5× card, and one bonus card. The traditional cards consist of four suits (diamonds, clubs, hearts, and spades) of thirteen ranks each (2, 3, 4, 5, 6, 7, 8, 9, 10, jack, queen, king, and ace). The joker cards are penalty cards that have no value or function by themselves. The free pick card allows the player to make a free selection in the next game round without placing a bet. The multiplier cards (2×, 3×, 4×, and 5×) are persistent game elements and endure from one game round to the next, they multiply the prize associated with the selected card in the next game round by their respective values. The bonus card triggers the bonus level 1 game in the next game round.

To play the base game of Piqum™, a player places a bet on a game round by selecting a denomination ($1, $5, $10 or $25) and a number of credits (1 to 10). The player can also choose to play in single-hand or multi-hand modes. In single-hand mode, the player plays one hand of five cards at a time. In multi-hand mode, the player plays multiple hands (e.g., three hands) of five cards at a time with an equal bet for each hand.

After placing the bet, the player presses a deal button to initiate the game round. Five cards are randomly dealt from the deck and displayed face down on the screen. The player can then pick one of the five cards by touching or clicking on it. The picked card is highlighted. The player then presses a reveal button to reveal all the five cards and determine the outcome of the game round.

The outcome of the game round depends on the type and rank of the picked card. If the picked card is an ace or a royal (jack, queen or king), the player wins a prize based on their bet and rank of the card. For example, an ace pays four times the bet, a king pays three times the bet, a queen pays two times the bet, and a jack pays one time the bet. If the picked card is a joker or a number card (2 to 10), the player loses the game round and forfeits their bet. If the picked card is a free pick card or a multiplier card, the player does not win or lose anything in that game round, but instead gets a free pick or a multiplier for the next game round. The free pick or multiplier is indicated by a symbol that persists on one of the five card positions until it is used or cancelled. If the player picks a free pick position in the next game round, they do not have to place a bet for that selection. If the player picks a multiplier position in the next game round, and reveals an ace or a royal, they win a prize multiplied by the value of the multiplier. If the player picks a multiplier position in the next game round, and reveals anything other than an ace or a royal, they lose the game round and the multiplier.

If multiple multipliers are picked in consecutive game rounds, they multiply each other until they are used or cancelled. For example, if the player picks a 3× card and reveals a 5× card, they get a 15× multiplier for the next game round. If they pick the 15× position and reveal an ace in the next game round, they win a prize of 60 times their bet (4 times 15). If they pick the 15× position and reveal a joker in the next game round, they lose the game round and the 15× multiplier. If the picked card is a bonus card, the player does not win or lose anything in that game round, but instead triggers the bonus level 1 game in the next game round. The Bonus Level 1 game is played with a different deck of cards and offers access to a mini jackpot.

The base game of piQum continues until the player ends the game or runs out of credits. The player can end the game by pressing a cash out button or by closing the game window. The player can also change their bet between game rounds unless they are in a Bonus round or have a free pick or a multiplier that locks their bet to current or lower options. If the player changes their bet to a higher value while being in a Bonus round or having an active free pick or a multiplier, they are dealt a new base game hand with no active persistent elements.

In one example of a Piqum™ game, Piqum™ Classic, there are eight bonus levels, each with its own deck of five cards. The bonus level 1 game is triggered by picking a bonus card in the base game. The bonus level 2 to 8 games are triggered by picking a bonus up card in the current bonus level game. Bonus levels can also be downgraded by picking a bonus down card in the current bonus level game.

Figure 3A:
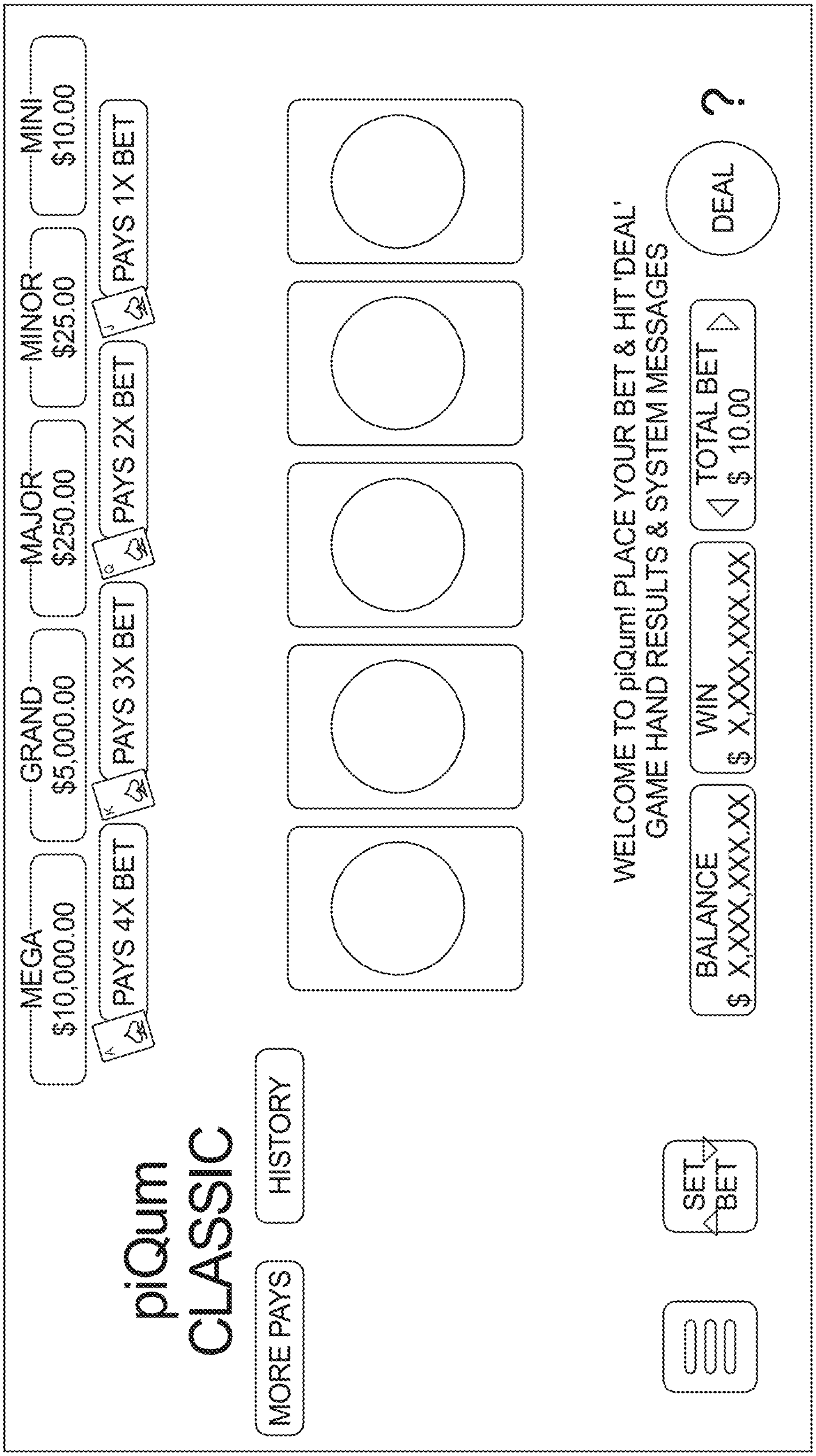
FIG. 3A is an exemplary view of a screenshot of the electronic card game with a base game that may be used with the system and gaming machine shown in FIG. 1, according to an embodiment of the present invention.
Figure 4A:
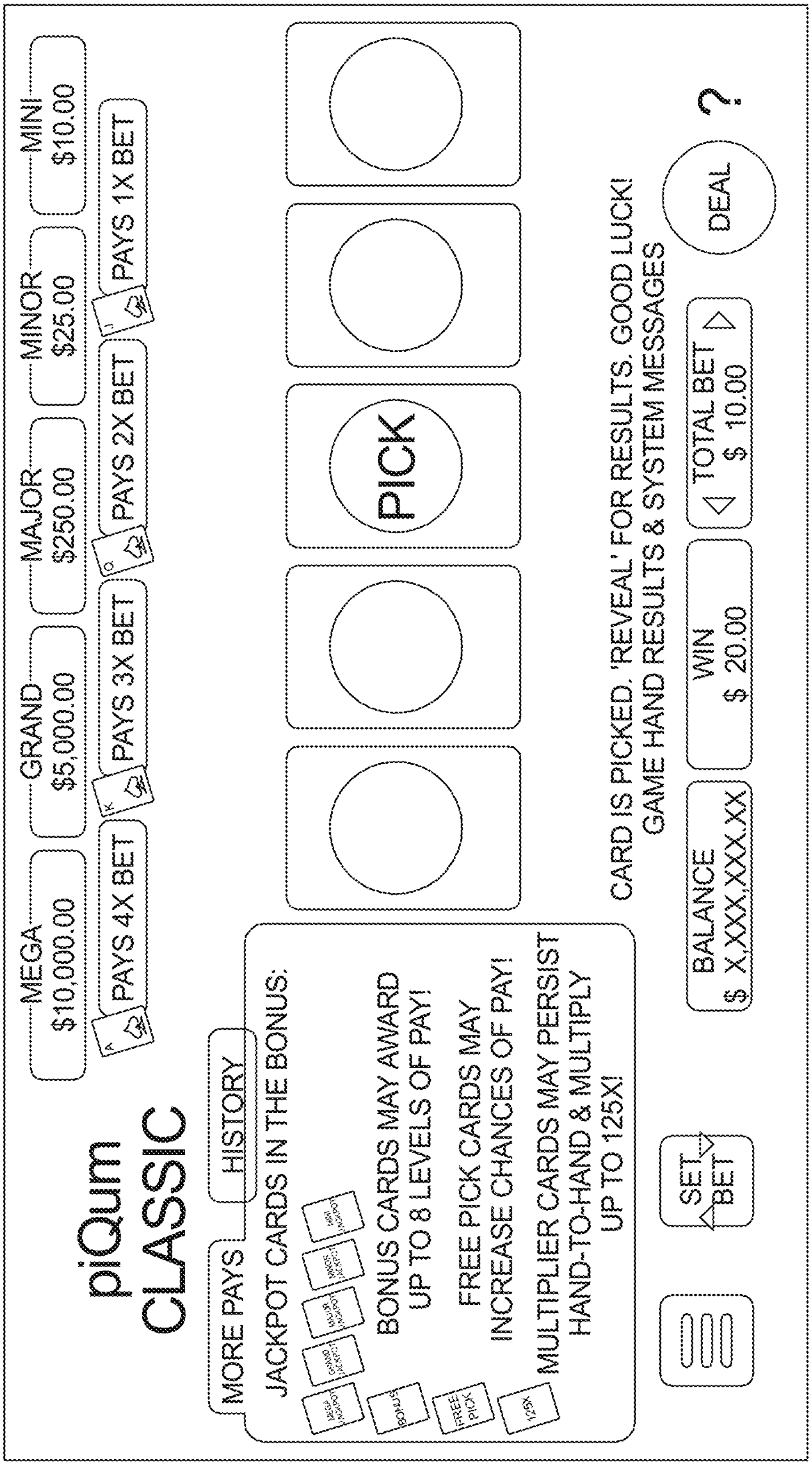
FIG. 4A is an exemplary view of a screenshot of the electronic card game with the base game having a reveal that may be used with the system and gaming machine shown in FIG. 1, according to an embodiment of the present invention.
Figure 5A:
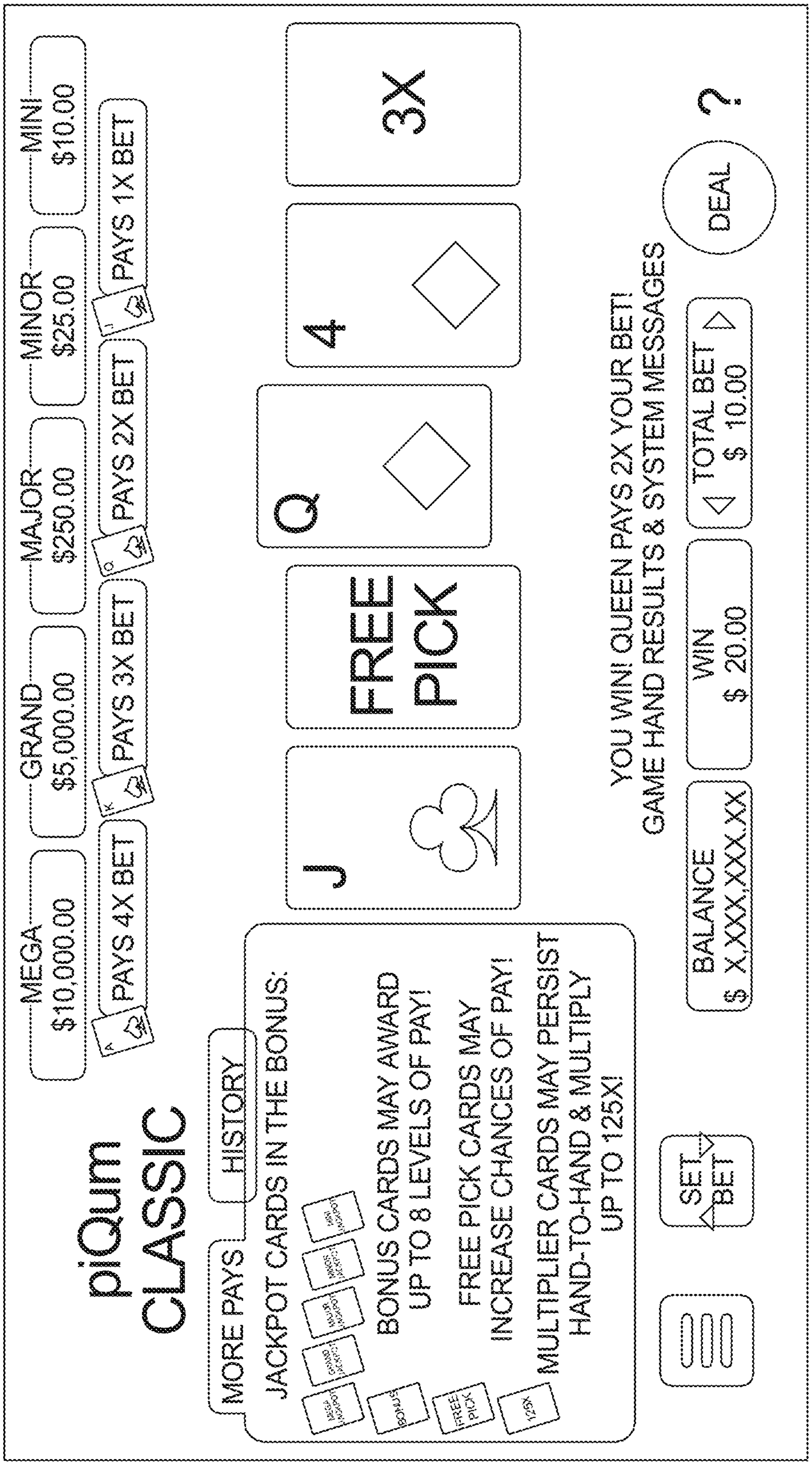
FIG. 5A is an exemplary view of a screenshot of the electronic card game with the base game showing the results that may be used with the system and gaming machine shown in FIG. 1, according to an embodiment of the present invention.

In the Classic Piqum™ game round, the player is offered the backs of five electronic cards 152 as illustrated in FIG. 3A and must select one of these electronic cards 152 as illustrated in FIG. 4A. Once the player has made their selection, the electronic cards 152 are turned over and revealed as illustrated in FIG. 5A. It should be appreciated that the Base Game uses a Base Game deck of the electronic cards 152 as illustrated in FIG. 2A and ten (10) different levels of a Bonus Game.

In the Base Game, each player pick will result in a winning, losing, or bonus card selection or in some instances persistence elements are unlocked that are overlaid upon the next batch of dealt electronic cards 152 providing players with additional criteria on which to base their next decision. At the completion of most player picks, the dealt electronic cards 152 are revealed so that the player can see what cards they did or did not pick as illustrated in FIG. 5A. It should be appreciated that there is a simple skill component to picking the electronic cards, which is driven by persistent elements such as multipliers and free pick cards, and there is an optimal strategy related to how the player deals with these options.

The Piqum™ UI action button changes state based on the game state: Deal—to start a new game and present the player with 5 card backs to select from; Inert—pending card selection; Reveal—to flip cards and reveal all cards once a card has been selected; Deal—to start a new bonus game and present the player with the five cards available relative to the bonus level; Shuffle—to flip and shuffle bonus cards for selection; Inert—pending card selection in bonus game; and Reveal—to flip cards and reveal all cards once a card has been selected in a bonus game.

Figure 3B:
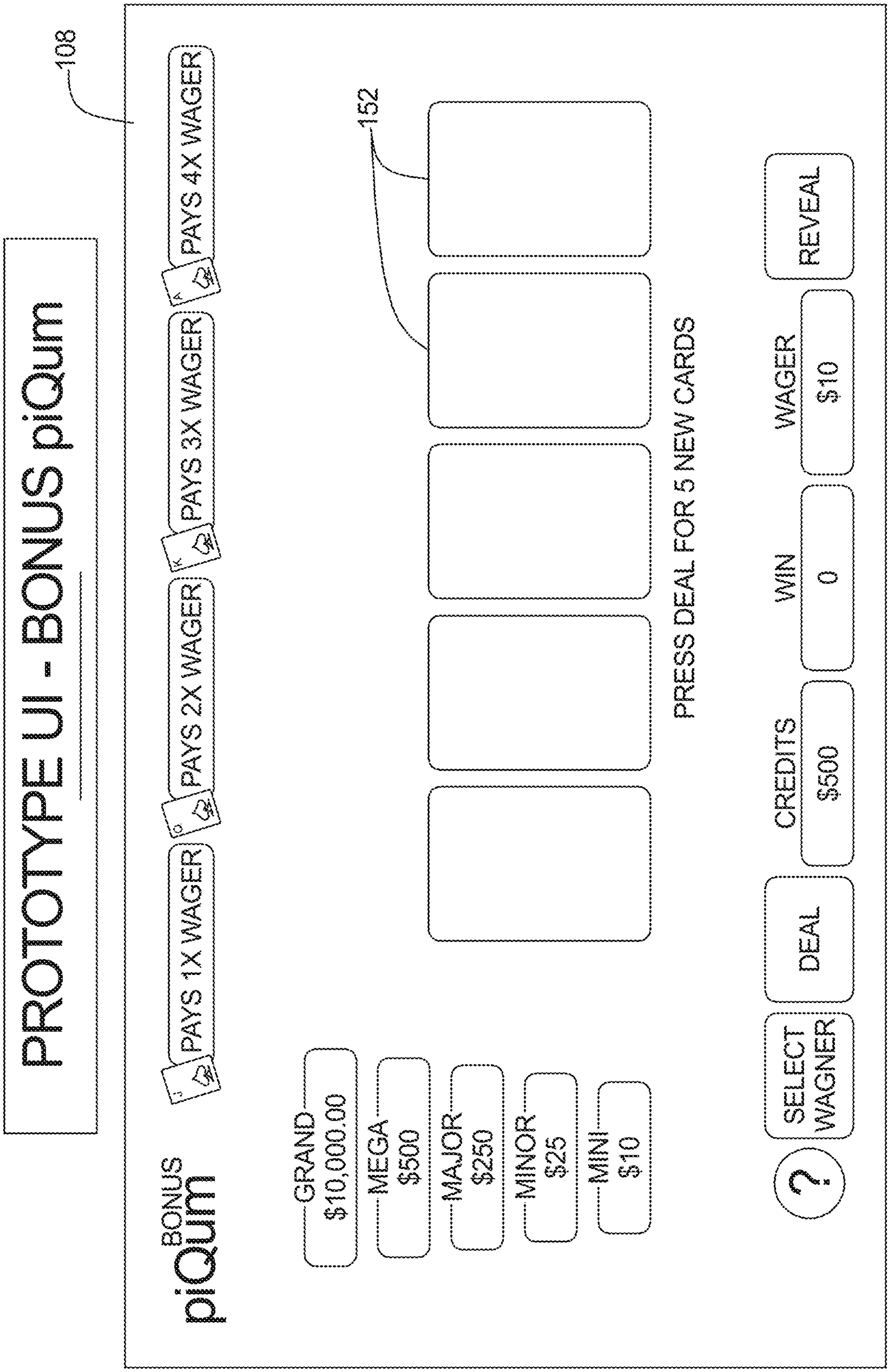
FIG. 3B is an exemplary view of a screenshot of the electronic card game with a bonus game that may be used with the system and gaming machine shown in FIG. 1, according to an embodiment of the present invention.
Figure 4B:
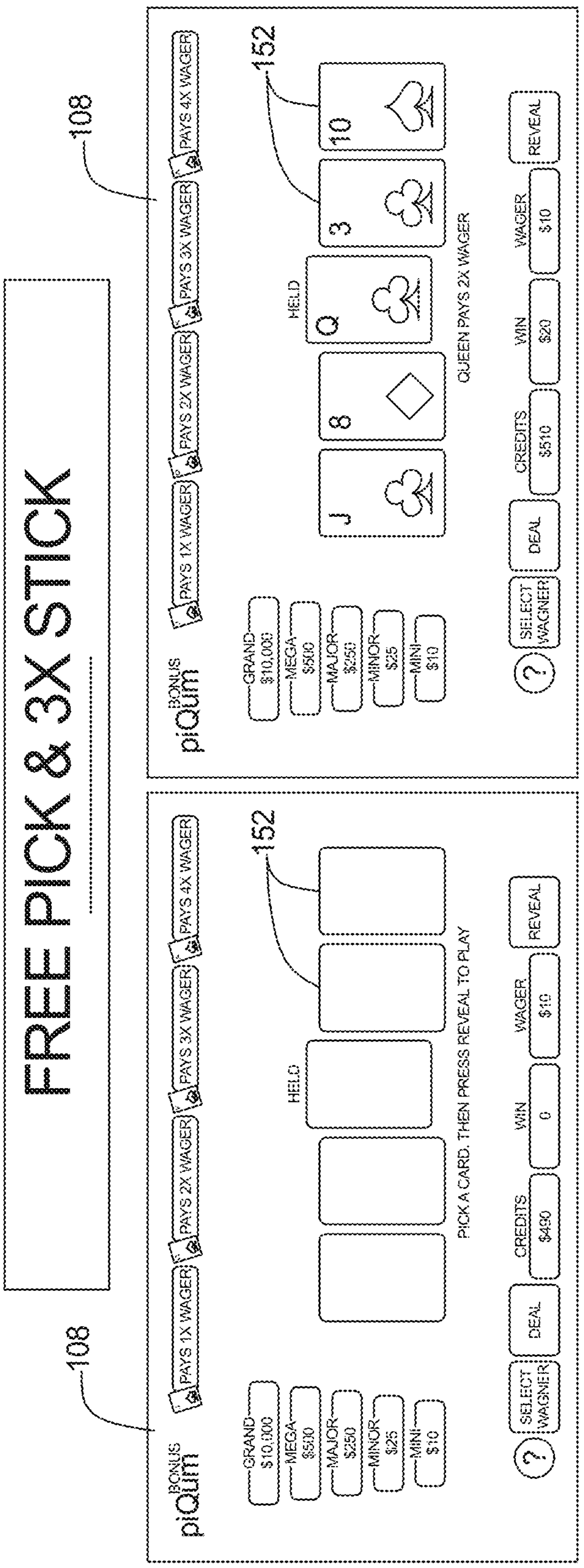
FIG. 4B is an exemplary view of a screenshot of the electronic card game with the bonus game having a free pick and 3× stick that may be used with the system and gaming machine shown in FIG. 1, according to an embodiment of the present invention.

In each Bonus Piqum™ game round, the player is offered the backs of five electronic cards 152 as illustrated in FIG. 3B and must select one of these electronic cards 152. Once the player has made their selection, the electronic cards 152 are turned over and revealed as illustrated in FIG. 4B. It should be appreciated that the Bonus Game uses its own Bonus Game Level deck of electronic cards 152 as illustrated in FIG. 2B.

Figure 5B:
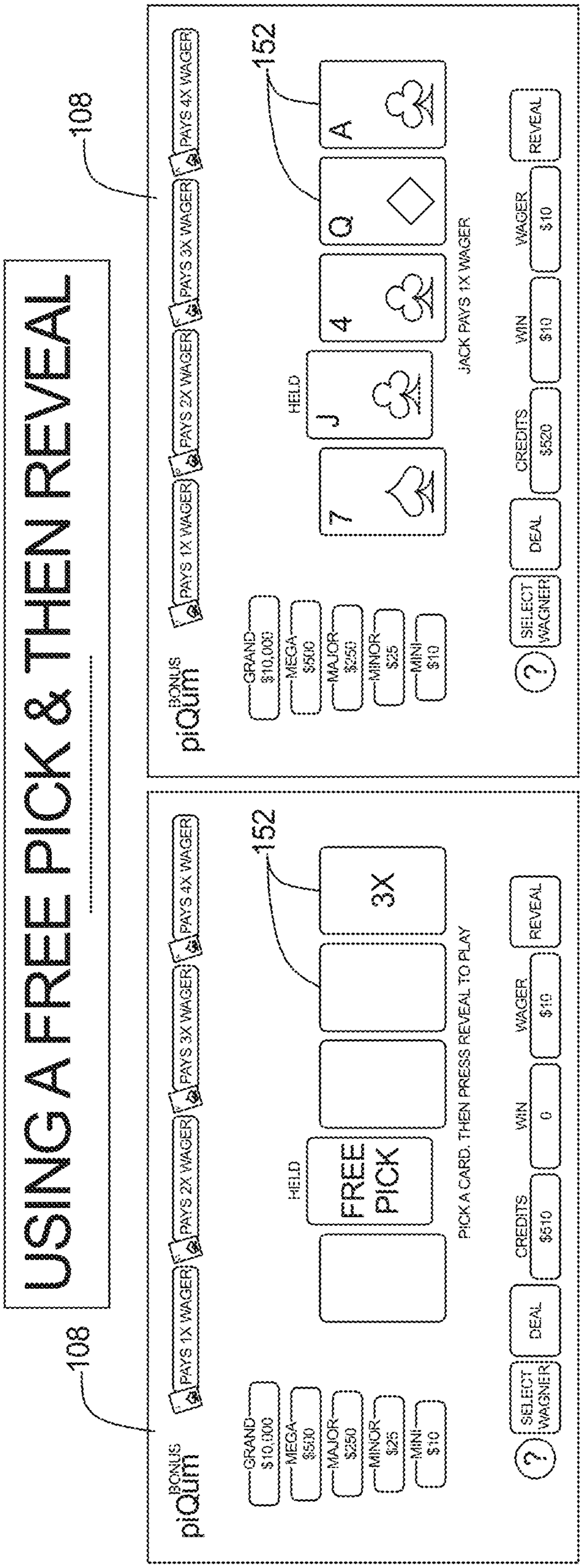
FIG. 5B is an exemplary view of a screenshot of the electronic card game with the bonus game using the free pick and then reveal that may be used with the system and gaming machine shown in FIG. 1, according to an embodiment of the present invention.

In the Bonus Game, each player pick will result in a winning, losing, or bonus card selection or in some instances persistence elements are unlocked that are overlaid upon the next batch of dealt electronic cards 152 providing players with additional criteria on which to base their next decision. At the completion of most player picks, the dealt electronic cards 152 are revealed so that the player can see what cards they did or did not pick as illustrated in FIG. 5B. It should be appreciated that there is a simple skill component to picking the electronic cards, which is driven by persistent elements such as multipliers and free pick cards, and there is an optimal strategy related to how the player deals with these options.

Figure 6:
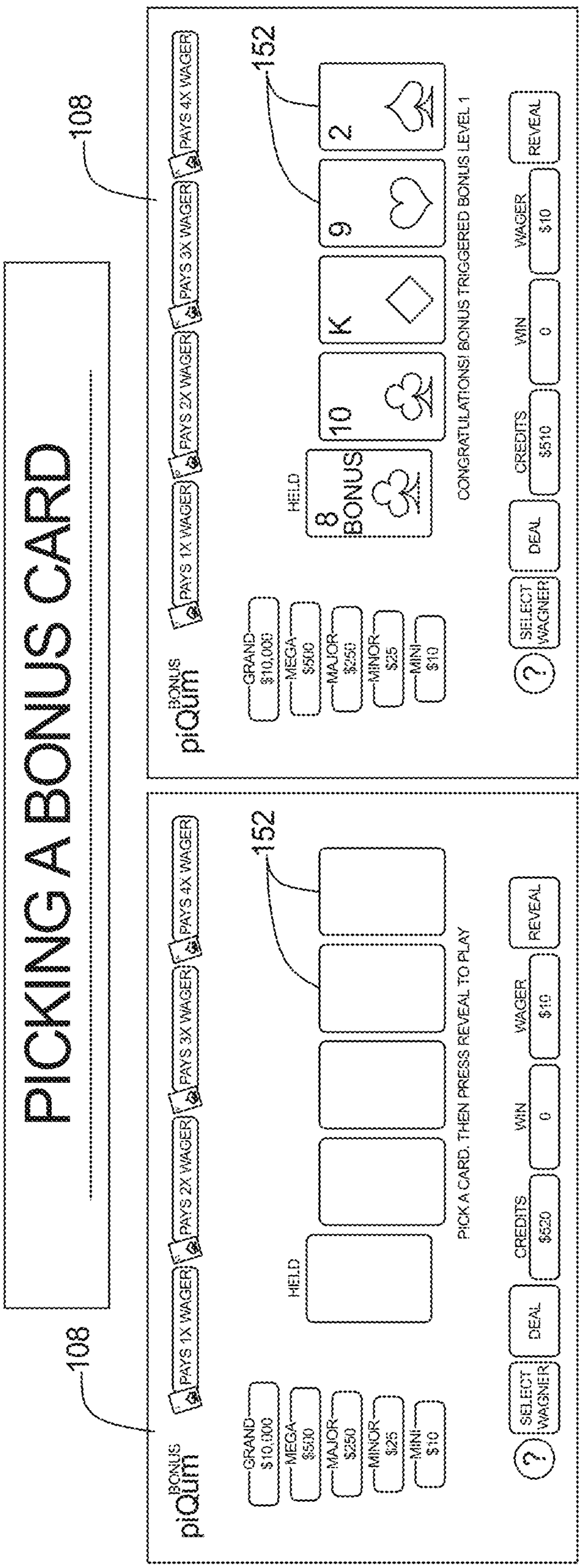
FIG. 6 is an exemplary view of a screenshot of the electronic card game with the bonus game picking a bonus card that may be used with the system and gaming machine shown in FIG. 1, according to an embodiment of the present invention.
Figure 7:
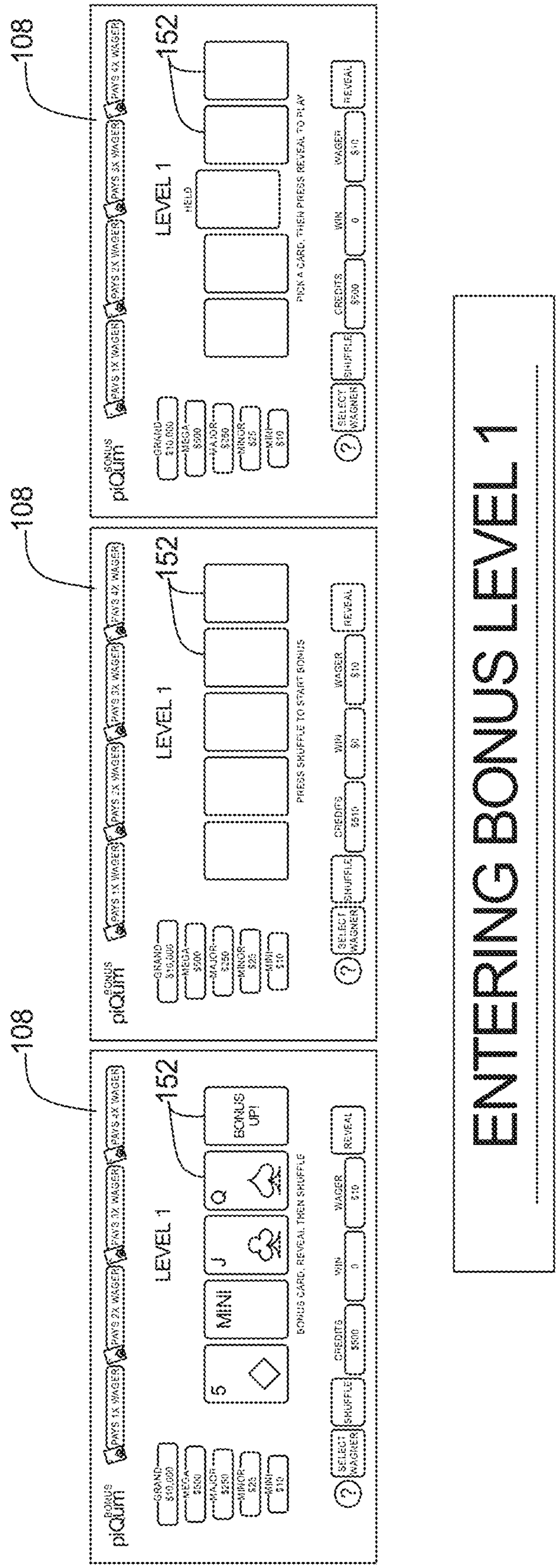
FIG. 7 is an exemplary view of a screenshot of the electronic card game with the bonus game entering a first bonus level that may be used with the system and gaming machine shown in FIG. 1, according to an embodiment of the present invention.
Figure 8:
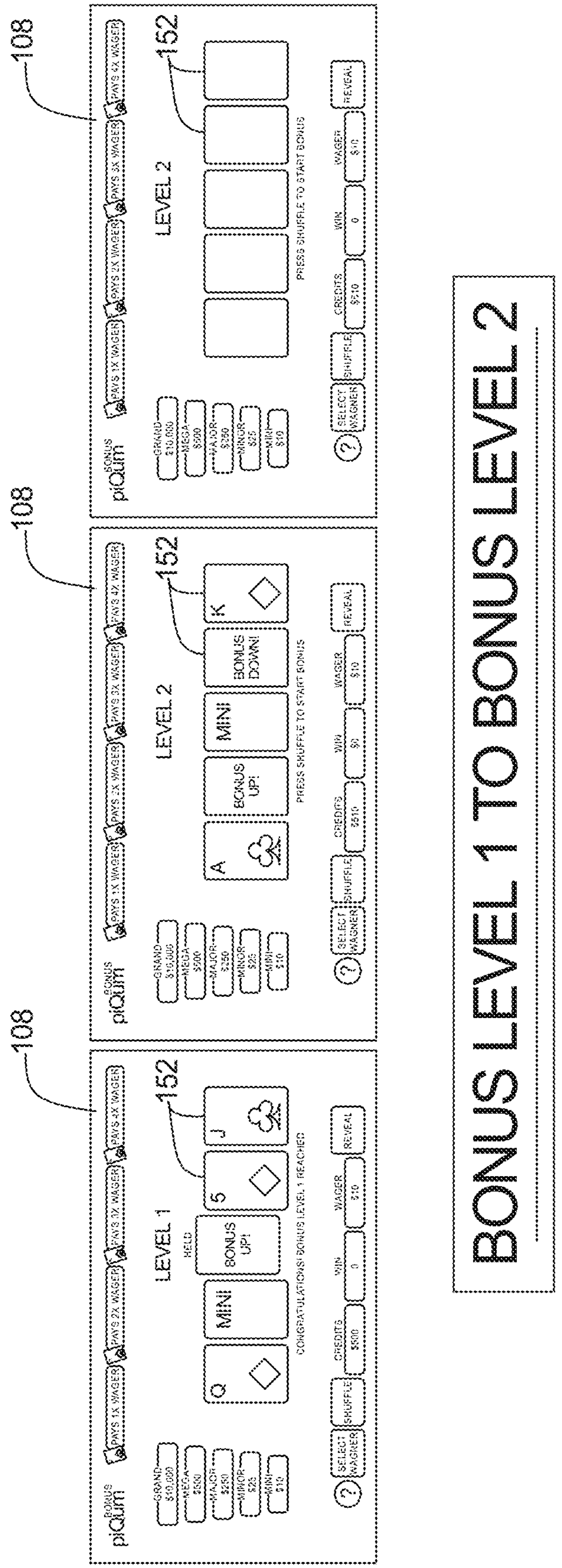
FIG. 8 is an exemplary view of a screenshot of the electronic card game with the bonus game advancing from the first bonus level to a second bonus level that may be used with the system and gaming machine shown in FIG. 1, according to an embodiment of the present invention.
Figure 9:
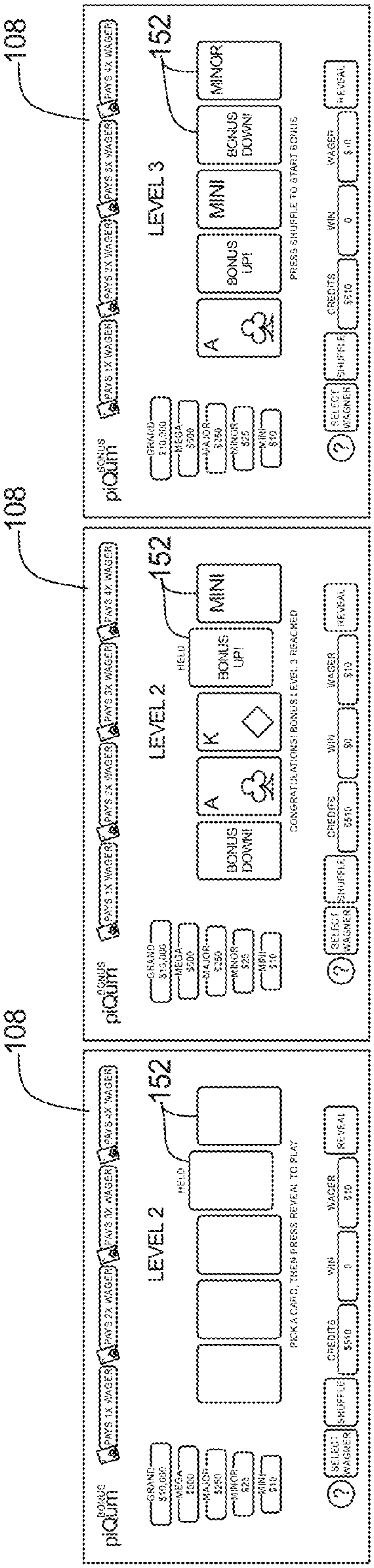
FIG. 9 is an exemplary view of a screenshot of the electronic card game with the bonus game advancing from the second bonus level to a third bonus level that may be used with the system and gaming machine shown in FIG. 1, according to an embodiment of the present invention.
Figure 10:
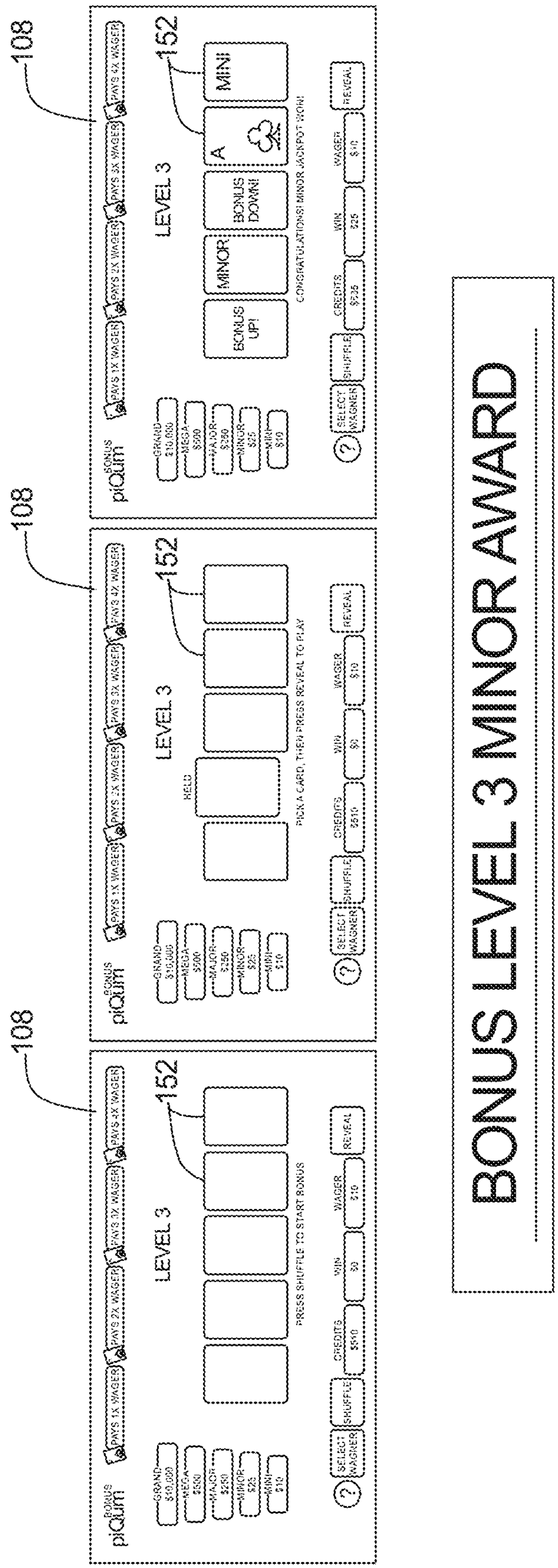
FIG. 10 is an exemplary view of a screenshot of the electronic card game with the bonus game illustrating the third bonus level with a minor award that may be used with the system and gaming machine shown in FIG. 1, according to an embodiment of the present invention.
Figure 11:
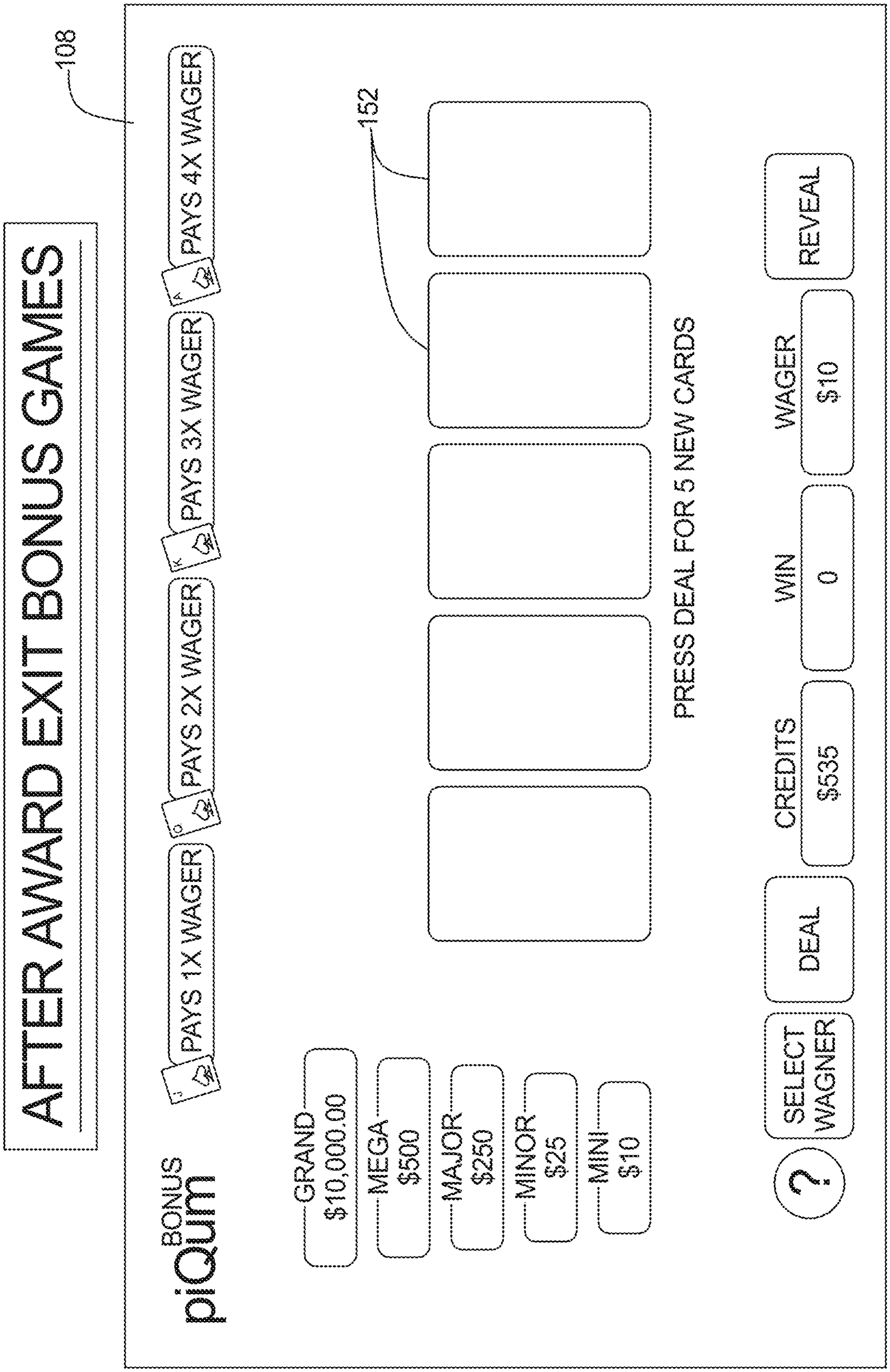
FIG. 11 is an exemplary view of a screenshot of the electronic card game with the bonus game illustrating after award exit bonus games that may be used with the system and gaming machine shown in FIG. 1, according to an embodiment of the present invention.

Bonus Piqum™ has several Bonus Game Levels, each of which has a dedicated five (5) card "fair deck" for players to pick from as illustrated in FIG. 6. The first Bonus level or Bonus Level 1 is accessed by picking a Bonus card in the Base Game as illustrated in FIG. 7. Once in Bonus level 1 players can either win an award and exit back into the Base Game or alternatively progress to higher Bonus Game levels by selecting Bonus Up cards as illustrated in FIGS. 8-10. Larger Jackpots and awards become available in higher level Bonus games. Players exit all bonus levels and return to the Base Game when any award is won as illustrated in FIG. 11. Once in Bonus Levels 2 through 10, players can also drop back to lower Bonus Levels or to Bonus Level 1 by selecting Bonus Down cards. It should be appreciated that a player cannot exit all Bonus levels without winning some award.

In one embodiment, for example, a "fair" deck electronic card game with a simple skill component, using a traditional deck of cards to which has been added a number of additional unique game cards as illustrated in FIG. 2. The electronic card game includes a Base Game and several levels of Bonus Game. The Base Game and each Bonus Game level has its own deck of electronic cards. Bonus Game levels provide access to Jackpots with larger Jackpots and greater odds of winning those Jackpots occurring in higher Bonus levels. Base Game electronic card deck options include 2-10 electronic cards; a Free Pick electronic card; A, K, Q & J electronic cards; Multiplier electronic cards 2×, 3×, 4×, 5×; a number of Joker electronic cards; and a Bonus electronic card. Players are offered five (5) electronic cards 152 randomly selected from the Base Game deck to pick from, once they have made their selection, the electronic cards 152 are flipped over to reveal what was or could have been won.

If picked, Royals are winners and have pays associated with them, for example: J=1× wager, Q=2× wager, K=3× wager, A=4× wager; 2-10 and Joker cards are losers. Joker cards (or any non-winning cards) can be, and in the Bonus Piqum™ electronic card game 150, are, used to control the hold percentage of the game. More Joker cards lower the return to player percentage. It should be appreciated that Jokers can also be used to create higher volatility game variants as is done in Double Bonus Piqum™ and Triple Bonus Piqum™ electronic card game 150 variants.

If a Free Pick electronic card 152 is picked, it locks in position and offers the player a position based free pick during the next game. If Multiplier electronic cards 152 are picked or revealed, they lock in position and offer players position-based multipliers in the next game. It should be appreciated that the Free Pick and Multiplier electronic cards 152 provide the skill basis for Piqum™ electronic card games 150.

Players can pick their wager from a range of available options, for example, any amount from 25 cents up to $25, but once a wager is selected, if Free Pick or Multiplier electronic cards are locked in place and are in play, the game is locked to that wager or lower wagers. For example, a player might enter a new game with a selected wager of $1 and have a game result showing no winning result like a Royal electronic card 152, but shows a Free Pick electronic card 152 in position 1, and one or more Multiplier electronic cards 152 on positions 2, 3, 4 or 5. In this instance their next game wager options would only be $1 or less.

Multiplier electronic cards 152 only apply to Royals electronic cards 152, so if a player picks an electronic card 152 that has a Multiplier locked in place on it and it reveals to be a Royal electronic card 152, then the associated award is multiplied by the respective Multiplier electronic card 152.

In each game, players must decide whether they use a Free Pick electronic card 152, if one is locked in place, or pay to pick another electronic card 152, perhaps one with a Multiplier or just one that they feel looks lucky. The skill component of this type of electronic card game 150 is driven by an optimal strategy of picking electronic cards 152 with Multipliers or Free Picks. If a Multiplier electronic card position is selected and a Royal electronic card 152 is revealed, then the pay associated with the Royal is multiplied accordingly and paid. An example would be in the Bonus Piqum™ Base Game when a player picks an electronic card 152 that has a 5× Multiplier locked in place and it reveals to show an Ace which is configured to pay 4× wager, resulting in a total award of 20× a player's wager. It should be appreciated that, in one embodiment, Bonus Piqum™ has only eight (8) levels of bonus game.

If a Bonus electronic card 152 is picked in the Base Game as illustrated in FIG. 6, Bonus Level 1 is triggered for the next game, during which electronic card options consist of only the Bonus Level 1 electronic card deck. Once a Bonus has been initiated, there must be an award paid to the player before the game reverts to the Base Game electronic deck of cards. It should be appreciated that the Piqum™ electronic card games have persistent elements such as Free Picks, Multipliers and Bonus Games/Bonus Levels, these elements persist and apply to the next game.

In Bonus Piqum™, each Bonus Level Game Deck consists of only five (5) electronic cards 152. Once a Bonus Game is initiated as illustrated in FIG. 7, the relevant five (5) electronic cards 142 from the relevant Bonus Game deck are displayed to the player, the player then initiates a shuffle and the electronic cards 152 are then flipped, shuffled and placed for selection. In one embodiment, Bonus level 1 electronic card deck might include two bonus up cards and three mini jackpot cards. In this embodiment, the mini jackpot pays fifteen (15) times the bet that triggered the bonus level 1 game, and there would be no Bonus Down electronic card 152 in a Bonus Level 1 of the Bonus Game. If during a Bonus Game, a Bonus Up electronic card is selected, a higher level of Bonus Game is triggered for the next game during in which only electronic cards 152 from the relevant bonus level deck are available as illustrated in FIG. 8. In another embodiment, Bonus Level 2 electronic card deck might include one bonus up card, one bonus down card, and three minor jackpot cards 152. In this embodiment, the minor jackpot pays thirty (30) times the bet that triggered the Bonus Level 1 game. If during a Bonus Level 2 game, a Bonus Down electronic card 152 is selected a lower level of Bonus Game, Bonus Level 1 is triggered for the next game during which only electronic cards 152 from the Bonus Level 1 deck of electronic cards 152 are available. If during a Bonus Level 2 game, a Bonus Up electronic card 152 is selected, a higher level of bonus game, Bonus level 3, is triggered for the next game during which only electronic cards 152 from Bonus Level 3 deck of electronic cards 152 are available as illustrated in FIG. 9. In one embodiment, Bonus Level 3 deck of electronic cards 152 may include one bonus up card, one bonus down card, one minor jackpot card, and two major jackpot cards. In this embodiment, the major jackpot pays ninety (90) times the bet that triggered the Bonus Level 1 game. In one embodiment, Bonus Level 4 deck of electronic cards 152 may include one bonus up card, one bonus down card, one minor jackpot card, one major jackpot card, and one grand jackpot card. In this embodiment, the grand jackpot pays three hundred (300) times the bet that triggered the Bonus Level 1 game. 152. In one embodiment, Bonus Level 5 deck of electronic cards 152 may include one bonus up card, one bonus down card, two major jackpot cards, and one grand jackpot card. The bonus up card allows the player to advance to the Bonus Level 6 game in the next game round. The bonus down card allows the player to return to the Bonus Level 4 game in the next game round. In one embodiment, Bonus Level 6 deck of electronic cards 152 may include one bonus up card, one bonus down card, one major jackpot card, and two grand jackpot cards. In one embodiment, Bonus Level 7 Card Deck might include one bonus up card, one bonus down card, one major jackpot card, one grand jackpot card, and one mega jackpot card. In this embodiment, the mega jackpot pays three thousand (3000) times the bet that triggered the bonus level 1 game. In one embodiment, Bonus Level 8 deck of electronic cards 152 may use a deck of five cards, including one bonus down card, two grand jackpot cards, and two mega jackpot cards. It should be appreciated that the bonus down card allows the player to return to the bonus level 7 game in the next game round.

In electronic deployments of Bonus Piqum™ electronic card game 150, the controller includes a processor to execute an algorithm of instructions as follows: a player presses Deal button and the RNG determines five (5) Base Game electronic cards 152 to present to the player. The player selects an electronic card 152 by touching the electronic card 152 or pressing a button associated with a specific card location. The player places a wager by pressing the Reveal button and the player's credit meter is decremented (in the event that a Free Pick option is locked in place and selected no wager is deducted from the Player's credit meter). All five of the electronic cards 152 are revealed and if a Royal electronic card 152 or other winning outcome was selected, then the Win meter shows an award amount and the player's credit meter is credited (If a Multiplier electronic card 152 was locked into position on a selected Royal electronic card 152, then the relevant award is multiplied accordingly and the multiplied award is displayed on the win meter and credited to the player's credit meter). If the selected electronic card 152 is a Free Pick electronic card 152, a Free Pick electronic card 152 is locked into position for the next game. If any of the revealed electronic cards 152 are Multiplier electronic cards 152, multipliers lock into position for next game (if a Bonus electronic card 152 is selected and Multiplier electronic cards 152 are revealed, these multipliers will locked into position in the first Base Game round after the player wins an award and exits relevant Bonus game as illustrated in FIG. 11). If a Bonus electronic card 152 (Bonus Up or Bonus Down) is selected, relevant Bonus deck electronic cards 152 are displayed for next game. If player elects to play a Bonus Game, the player presses the Shuffle button and the RNG determines the hidden location of each of the five (5) Bonus deck electronic cards 152.

In some instances, the game might not be based on a "fair" deck of electronic cards 152, and weighted tables could be used to drive card frequency. In some instances, the game might have a fixed pot incrementing Jackpots. In some instances, a variety of Bonus Game trigger electronic cards 152 could replace the Bonus, Bonus Up or Bonus Down electronic cards 152, in which case each Bonus trigger electronic card 152 would initiate a game based on a special deck of electronic cards 152, for example a Bonus A electronic card 152 would lead to a game based on Bonus Game A deck of electronic cards and a Bonus B electronic card 152 would lead to a game based on Bonus Game B deck of electronic cards 152. It should be appreciated that, in some instances, players might make picks from several sets of five (5) electronic cards 152 between each reveal.

The gaming machine controller 123 includes a processor, a memory device for storing program code or other data; a display as described above; and one or more input device interfaces. The gaming machine 102 may further include a sound output system having a sound card, speakers, headphone jack, and other means to drive sound output, one or more video cards configured to drive at least one display 118, and additional display units.

The processor is typically a microprocessor or microcontroller-based platform which is capable of displaying images on the display 118 of game symbols, creating and representationally displaying a game grid and game grid elements and various other components of the game. The memory device can include random access memory (RAM) for storing event data or other data generated or used during a particular game. The memory device can also include read only memory (ROM), or other non-transitory computer-readable media configured to store program code which controls the gaming machine 102 so it plays a particular game in accordance with applicable game rules and pay tables.

It should be appreciated that although a processor and memory devices are possible implementations, further embodiments can also be implemented using one or more application-specific integrated circuits (ASIC's) or other hard-wired devices, or using mechanical devices (collectively, and/or individually referred herein as a "processor"). Furthermore, although the processor and memory device in certain embodiments reside on each gaming machine 102, it is possible to provide some or all of their functions from an off-site device such as a network server for communication to a playing station such as over a local area network (LAN), wide area network (WAN), Internet connection, microwave link, and the like. The processor and memory device are generally referred to as a "computer" or "controller."

Input devices, can include physical buttons and controllers such as joysticks, mice, keyboards, and similar game controllers. Further, an input device can include specialized devices such as a currency acceptor configured to relay the input of value to the processor. Examples can include devices that: take in bills or coins, read credit cards, take contactless payments, or any other means of taking an item of worth and conveying the value of the worth to the processor. Physical buttons may be symbolically represented on a display device configured to display input information. The display device may further be configured to directly accept input from a user, as in a touch screen device or infrared screen overlay device. In further embodiments, additional value data may be obtained from a networked device configured to obtain value data and provide it to a processor.

This written description uses examples to disclose the aspects of the present invention, including the best mode, and also to enable any person skilled in the art to practice the invention, including making and using any devices or systems and performing any incorporated methods.

Those skilled in the art will readily appreciate that the systems and methods described herein may be a standalone system or incorporated in an existing gaming system. The system of the present invention may include various computer and network related software and hardware, such as programs, operating systems, memory storage devices, data input/output devices, data processors, servers with links to data communication systems, wireless or otherwise, and data transceiving terminals. It should also be understood that any method steps discussed herein, such as for example, steps involving the receiving or displaying of data, may further include or involve the transmission, receipt and processing of data through conventional hardware and/or software technology to effectuate the steps as described herein. Those skilled in the art will further appreciate that the precise types of software and hardware used are not vital to the full implementation of the methods of the present invention so long as players and operators thereof are provided with useful access thereto, either through a mobile device, gaming platform, or other computing platform via a local network or global telecommunication network.

Although specific features of various embodiments of the present invention may be shown in some drawings and not in others, this is for convenience only. In accordance with the principles of the present invention, any feature of a drawing may be referenced and/or claimed in combination with any feature of any other drawing.

A controller, computing device, or computer, such as described herein, includes at least one or more processors or processing units and a system memory. The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. The terms used herein, such as modules like display module, betting module, award module, servers, like player account server, database server, etc. are for ease in describing and illustrating features and operations of the present invention and are not to be considered limiting in any way. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

The order of execution or performance of the operations in the embodiments of the present invention illustrated and described herein is not essential, unless otherwise specified. That is, the operations described herein may be performed in any order, unless otherwise specified, and embodiments of the present invention may include additional or fewer operations than those disclosed herein. For example, it is contemplated that executing or performing a particular operation before, contemporaneously with, or after another operation is within the scope of aspects of the present invention.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

In some embodiments, a database, as described herein, includes any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif).

This written description uses examples to disclose the present invention, including the best mode, and also to enable any person skilled in the art to practice the present invention, including making and using any devices or systems and performing any incorporated methods. The patentable scope of the present invention is defined by the claims, and may include other examples that occur to those skilled in the art. Other aspects and features of the present invention can be obtained from a study of the drawings, the disclosure, and the appended claims. The present invention may be practiced otherwise than as specifically described within the scope of the appended claims. It should also be appreciated, that the steps and/or functions listed within the appended claims, notwithstanding the order of which steps and/or functions are listed therein, are not limited to any specific order of operation.

Those skilled in the art will readily appreciate that the systems and methods described herein may be a standalone system or incorporated in an existing gaming system. The system of the present invention may include various computer and network related software and hardware, such as programs, operating systems, memory storage devices, data input/output devices, data processors, servers with links to data communication systems, wireless or otherwise, and data transceiving terminals. It should also be understood that any method steps discussed herein, such as for example, steps involving the receiving or displaying of data, may further include or involve the transmission, receipt and processing of data through conventional hardware and/or software technology to effectuate the steps as described herein. Those skilled in the art will further appreciate that the precise types of software and hardware used are not vital to the full implementation of the methods of the present invention so long as players and operators thereof are provided with useful access thereto, either through a mobile device, gaming platform, or other computing platform via a local network or global telecommunication network.

Although specific features of various embodiments of the present invention may be shown in some drawings and not in others, this is for convenience only. In accordance with the principles of the present invention, any feature of a drawing may be referenced and/or claimed in combination with any feature of any other drawing.

What is claimed is:

1. A system for playing an electronic card game, said system comprising:

a gaming machine having a game display configured to display a plurality of electronic cards from a number of card decks of the electronic card game, at least one input device to provide an input, a credit meter, and a win meter;

a controller programed to display, on the game display, the electronic cards, and having a Random Number Generator (RNG), wherein the RNG calls are limited to a predetermined number of the electronic cards in each card deck; and wherein the controller includes a processor to execute an algorithm of instructions to:

receive the input from the at least one input device;

presenting the predetermined number of the electronic cards on the game display for a Base Game, the predetermined number of electronic cards being determined by the RNG;

receiving an input from the at least one input device for an amount of credits and decreasing the amount of credits from a credit meter;

receiving a selection of one of the predetermined number of the electronic cards from the at least one input device;

revealing all of the predetermined number of the electronic cards on the game display; and if a special electronic card or other winning outcome was selected, displaying by the win meter an award amount and crediting the credit meter with the award amount.

2. The system as set forth in claim 1 wherein if a Multiplier electronic card of the predetermined number of electronic cards was locked into position on the selected electronic card, then multiplying the relevant award and displaying the multiplied relevant award on the win meter and crediting the credit meter with the multiplied relevant award.

3. The system as set forth in claim 1 wherein if the selected electronic card is a Free Pick electronic card of the predetermined number of cards, locking into position the Free Pick electronic card for a next game.

4. The system as set forth in claim 1 wherein if any of the revealed electronic cards are Multiplier electronic cards, locking the Multiplier electronic cards into position for a next game.

5. The system of claim 4 wherein if a Bonus electronic card is selected and the Multiplier electronic cards are revealed, locking the Multiplier electronic cards into position in the first Base Game round after a player wins an award and exiting a Bonus game.

6. The system of claim 5 wherein if the Bonus electronic card is a Bonus Up or Bonus Down selected, displaying relevant Bonus deck electronic cards for a next game.

7. The system as set forth in claim 6 wherein the processor receives an input from the at least one input device to play a Bonus Game.

8. The system as set forth in claim 7 wherein the RNG determines a hidden location of each of a predetermined number of the Bonus deck electronic cards.

9. A gaming machine for playing an electronic card game comprising:

a game display configured to display a plurality of electronic cards of the electronic card game, at least one input device to provide an input, a credit meter, and a win meter;

a controller programed to display, on the game display, the electronic cards, and having a Random Number Generator (RNG), wherein the RNG calls are limited to a predetermined number of the electronic cards in each card deck; and wherein the controller includes a processor to execute an algorithm of instructions to:

receive the input from the at least one input device;

presenting a predetermined number of the electronic cards on the game display for a Base Game, the predetermined number of electronic cards being determined by the RNG;

receiving an input from the at least one input device for an amount of credits and decreasing the amount of credits from a credit meter;

receiving a selection of one of the predetermined number of the electronic cards from the at least one input device;

revealing all of the predetermined number of the electronic cards on the game display; and if a special electronic card or other winning outcome was selected, displaying by the win meter an award amount and crediting the credit meter with the award amount.

10. The gaming machine as set forth in claim 9 wherein if a Multiplier electronic card of the predetermined number of electronic cards was locked into position on the selected electronic card, then multiplying the relevant award and displaying the multiplied relevant award on the win meter and crediting the credit meter with the multiplied relevant award.

11. The gaming machine as set forth in claim 9 wherein if the selected electronic card is a Free Pick electronic card of the predetermined number of cards, locking into position the Free Pick electronic card for a next game.

12. The gaming machine as set forth in claim 9 if any of the revealed electronic cards are Multiplier electronic cards, locking the Multiplier electronic cards into position for a next game.

13. The gaming machine as set forth in claim 12 wherein if a Bonus electronic card is selected and the Multiplier electronic cards are revealed, locking the Multiplier electronic cards into position in the first Base Game round after a player wins an award and exiting a Bonus game.

14. The gaming machine as set forth in claim 13 wherein if the Bonus electronic card is a Bonus Up or Bonus Down selected, displaying relevant Bonus deck electronic cards for a next game.

15. The gaming machine as set forth in claim 14 wherein the processor receives an input from the at least one input device to play a Bonus Game.

16. The gaming machine as set forth in claim 15 wherein the RNG determines a hidden location of each of a predetermined number of the Bonus deck electronic cards.

17. A control method of playing an electronic card game, said method comprising the steps of:

providing a gaming device having a game display configured to display a plurality of electronic cards of the electronic card game, at least one input device to provide an input, a credit meter, and a win meter;

programming a controller programed to display, on the game display, the electronic cards, and having a Random Number Generator (RNG) wherein the RNG calls are limited to a predetermined number of the electronic cards in each card deck; and executing by a processor of the controller an algorithm of instructions to:

receive the input from the at least one input device;

presenting a predetermined number of the electronic cards on the game display for a Base Game, the predetermined number of electronic cards being determined by the RNG;

receiving an input from the at least one input device for an amount of credits and decreasing the amount of credits from a credit meter;

receiving a selection of one of the predetermined number of the electronic cards from the at least one input device;

revealing all of the predetermined number of the electronic cards on the game display; and if a special electronic card or other winning outcome was selected, displaying by the win meter an award amount and crediting the credit meter with the award amount.

18. The control method as set forth in claim 17 wherein if a Multiplier electronic card of the predetermined number of electronic cards was locked into position on the selected electronic card, then multiplying the relevant award and displaying the multiplied relevant award on the win meter and crediting the credit meter with the multiplied relevant award.

19. The control method as set forth in claim 18 wherein a plurality of the Multiplier electronic card of the predetermined number of electronic cards are revealed and picked in consecutive game rounds multiply each other until they are used or cancelled.

20. The control method as set forth in claim 17 wherein if the selected electronic card is a Free Pick electronic card of the predetermined number of cards, locking into position the Free Pick electronic card for a next game.

21. The control method of claim 17 wherein if a Bonus electronic card is selected and the Multiplier electronic cards are revealed, locking the Multiplier electronic cards into position in the first Base Game round after a player wins an award and exiting a Bonus game.

22. The control method of claim 21 wherein if the Bonus electronic card is a Bonus Up or Bonus Down selected, displaying relevant Bonus deck electronic cards for a next game.

23. The control method as set forth in claim 22 receiving by the processor an input from the at least one input device to play a Bonus Game.

24. The control method as set forth in claim 23 determining by the RNG a hidden location of each of a predetermined number of the Bonus deck electronic cards.

25. The control method as set forth in claim 17 wherein the special electronic card is a jackpot triggering card comprising a mini, minor, major, grand and mega electronic card.

* * * * *